(12) United States Patent
Polk

(10) Patent No.: US 8,156,536 B2
(45) Date of Patent: Apr. 10, 2012

(54) ESTABLISHING SECURE COMMUNICATION SESSIONS IN A COMMUNICATION NETWORK

(75) Inventor: James M. Polk, Colleyville, TX (US)

(73) Assignee: Cisco Technology, Inc., San Jose, CA (US)

( * ) Notice: Subject to any disclaimer, the term of this patent is extended or adjusted under 35 U.S.C. 154(b) by 1221 days.

(21) Appl. No.: 11/607,404

(22) Filed: Dec. 1, 2006

(65) Prior Publication Data

US 2008/0133761 A1 Jun. 5, 2008

(51) Int. Cl.
*G06F 21/00* (2006.01)

(52) U.S. Cl. ............ 726/1; 713/166; 713/167; 713/168; 713/169; 713/170; 713/171; 713/172; 713/150; 713/151; 713/152; 713/153; 709/225; 709/228; 709/229; 726/2; 726/3; 726/4

(58) Field of Classification Search .............. 726/12–14, 726/1–4, 27–30; 709/225, 228, 229; 713/150–154, 713/165–172
See application file for complete search history.

(56) References Cited

U.S. PATENT DOCUMENTS

| | | | | |
|---|---|---|---|---|
| 6,816,762 | B2 * | 11/2004 | Hensey et al. | 701/35 |
| 7,607,006 | B2 * | 10/2009 | Ahuja et al. | 713/151 |
| 7,650,628 | B2 * | 1/2010 | Zimmerman et al. | 726/2 |
| 2002/0169874 | A1 * | 11/2002 | Batson et al. | 709/225 |
| 2003/0108205 | A1 * | 6/2003 | Joyner et al. | 380/277 |
| 2005/0097357 | A1 * | 5/2005 | Smith | 713/201 |
| 2005/0235150 | A1 * | 10/2005 | Kaler et al. | 713/168 |
| 2006/0218399 | A1 * | 9/2006 | FitzGerald et al. | 713/168 |
| 2007/0174613 | A1 * | 7/2007 | Paddon et al. | 713/168 |

OTHER PUBLICATIONS

Ching-Te Wang, NPL document "Supervising secret-Key Agreements in a Level-Based Hierarchy", IEEE 2004.*
Rosenberg, J., et al., "SIP: Session Initiation Protocol," RFC 3261, pp. 1-271, (2002).
"Authentication Context for the OASIS Security Assertion Markup Language (SAML) V2.0" [http://docs.oasis-open.org/security/saml/v2.0/], pp. 1-70 (2005).
"Conformance Requirements for the OASIS Security Assertion Markup Language (SAML) V2.0" [http://docs.oasis-open.org/security/saml/v2.0/], pp. 1-19 (2005).
"Profiles for the OASIS Security Assertion Markup Language (SAML) V2.0" [http://docs.oasis-open.org/security/saml/v2.0/], pp. 1-66 (2005).
"Bindings for the OASIS Security Assertion Markup Language (SAML)" [http://docs.oasis-open.org/security/saml/v2.0/], pp. 1-46 (2005).
"Glossary for the OASIS Security Assertion Markup Language (SAML) V2.0" [http://docs.oasis-open.org/security/saml/v2.0/], pp. 1-16 (2005).
"Metadata for the OASIS Security Assertion Markup Language (SAML) V2.0" [http://docs.oasis-open.org/security/saml/v2.0/], pp. 1-43 (2005).

* cited by examiner

Primary Examiner — Taghi Arani
Assistant Examiner — Josnel Jeudy

(57) ABSTRACT

In one embodiment, a method for establishing a session between a first party and a second party in a communication network comprises issuing a request to establish the session with the second party, the request containing a first security level associated with the first party. A response is received to the request from the second party, the response containing a second security level associated with the second party. A security level for the session is identified from the first security level and the second security level and the session established at the identified security level.

20 Claims, 13 Drawing Sheets

ESTABLISHING SECURE COMMUNICATION SESSIONS IN A COMMUNICATION NETWORK

TECHNICAL FIELD

The present disclosure relates generally to secure communications.

BACKGROUND

A communication network is a collection of nodes interconnected by communication links and segments for transporting information (e.g., data) between the nodes. The nodes may include intermediate nodes, such as routers and switches, and end nodes, such as personal computers, telephones, personal digital assistants (PDAs), video units and the like. The intermediate nodes are typically forward information in the network between the end nodes. The end nodes typically act as origination and destination points for the information.

Many types of communication networks are available, with the types ranging from local area networks (LANs) to wide area networks (WANs). LANs typically connect nodes over dedicated private communications links located in the same general physical location, such as a building or campus. WANs, on the other hand, typically connect large numbers of geographically dispersed nodes over long-distance communications links, such as common carrier telephone lines. The Internet is an example of a WAN that connects networks throughout the world, providing global communication between nodes on various networks.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Some communication networks utilize communication sessions to communicate information, such as video and/or audio information, between users in the network. A communication session is a transaction in which information is exchanged between two or more parties in a communication network. The parties may be, e.g., users, computer systems, network devices (e.g., routers, switches), telephones and the like. An example of a communication session is a telephone call between a plurality of parties in which audio information is exchanged between the parties. Another example of a communication session is a videoconference between a plurality of parties where video and voice may be exchanged between the parties. Communication sessions are typically established between a calling party and a called party. A calling party is a party that typically initiates the session by e.g., placing a call to the called party. The called party is the party that is being called by the calling party.

A secure communication session is a session in which information is exchanged in the session in a secure manner in order to avoid unauthorized reception of cleartext communications, e.g., eavesdropping. Encryption is often employed to secure the information. One cryptography technique that may be used to encrypt information in a secure communication session is "public key" cryptography. Here, each party in the secure communication session is associated with a pair of cryptographic keys, designated as a public key and private key, that are used to secure information. A party's public key is made public to other parties in the session and is used by those parties to encrypt information intended for the party. A party's private key is kept private by the party (i.e., not disclosed to others) and is used by the party to decrypt information that was encrypted using the party's public key. Eavesdropping is avoided using this scheme because the private key must be known in order to decrypt the received encrypted information.

Some secure communication systems employ special equipment to perform encryption. For example, some secure communication systems employ special telephones that are configured to encrypt/decrypt information carried in a secure communication session. In a typical arrangement, as a party speaks into the telephone, the telephone equipment digitizes party's speech, encrypts the digitized speech and transfers the encrypted digitized speech to another party. The other party's telephone receives the encrypted digitized speech, decrypts it to reveal the original digitized speech and converts the digitized speech to audio signals that are heard by the other party.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DESCRIPTION OF EXAMPLE EMBODIMENTS

Overview

Figure 1:
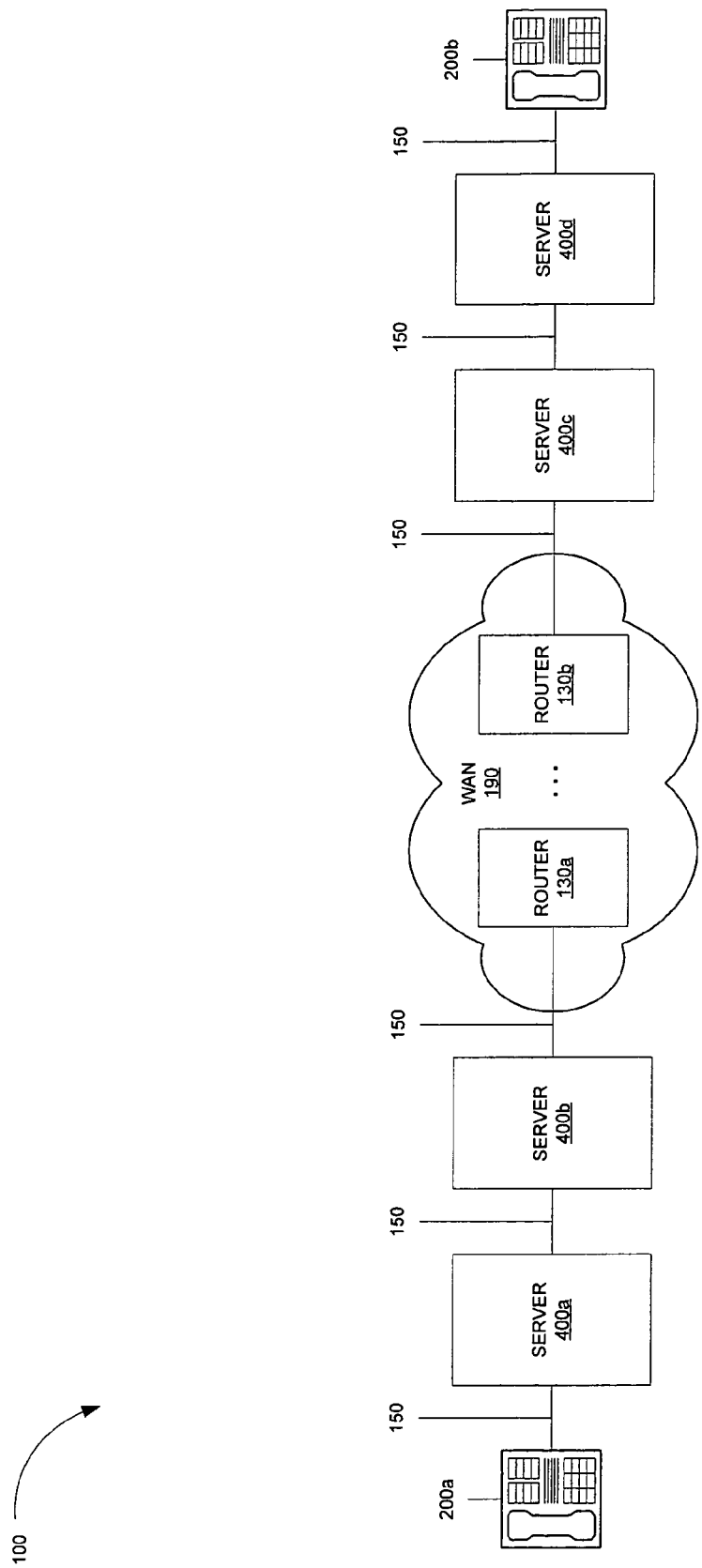
FIG. 1 illustrates an example communication network that may be used with the techniques described herein.

A method for establishing a session between a first party and a second party in a communication network comprises issuing a request to establish the session with the second party, the request containing a first security level associated with the first party; receiving a response to the request from the second party, the response containing a second security level associated with the second party; identifying a security level for the session from the first security level and the second security level; and establishing the session at the identified security level.

A method for allowing a third party to join an established session between two or more parties in a communication network comprises receiving a request from the third party to join the established session, the request comprising a security level associated with the third party; determining if the third party may join the session based on the security level; and allowing the third party to join the session if it is determined that the third party may join the session.

It should be noted, illustrated embodiments of the techniques described herein are described as using the Session Initiation Protocol (SIP) and the Security Assertion Markup Language (SAML), e.g., to establish and maintain sessions in a communication network and exchange information in the network. A version of the SIP protocol that may adapted for use with the techniques described herein is described in J. Rosenberg et al., "SIP: Session Initiation Protocol," RFC 3261, June 2002, which is available from the Internet Engineering Task Force (IETF) and which is incorporated by reference in its entirely as though fully set forth herein. A version of SAML that may be adapted for use with the techniques described herein is described in "Authentication Context for the OASIS Security Assertion Markup Language (SAML) V2.0", "Conformance Requirements for the OASIS Security Assertion Markup Language (SAML) V2.0", "Profiles for the OASIS Security Assertion Markup Language (SAML) V2.0", "Bindings for the OASIS Security Assertion Markup Language (SAML)", "Glossary for the OASIS Security Assertion Markup Language (SAML) V2.0"and "Metadata for the OASIS Security Assertion Markup Language (SAML) V2.0" all of which are available from the Organization for the Advancement of Structured Information Standards (OASIS) and all of which are hereby incorporated by reference in their entirety as though fully set forth herein. It should be noted that other protocols and communication techniques may be adapted to be used with the techniques described herein.

One problem with the above-described techniques is that while they may be effective for securing communications in a communication session, e.g., to obviate eavesdropping on information carried in the communication session, the techniques are not very effective for ensuring that the information is conveyed to parties that are authorized to receive the information.

For example, assume a first party wishes to convey "top secret" information via a communication session to a second party. Using the above-described techniques, the first party has no assurances that the second party participating in the communication session is indeed cleared to receive the information. At best, the first party may assume that since the second party has access to, e.g., a particular secure telephone or a private key that the second party must have the proper clearance to receive the information. This assumption fails, however, if the secure telephone or private key is accessible to other potential parties that may not be cleared to receive the information.

A calling party may engage in communications with a certain called party for communications of a less secure nature, thus creating hierarchical levels of secure communications between any two (or more) parties.

The techniques described herein overcome shortcomings associated with the above-described techniques by taking security levels associated with parties into consideration when establishing communication sessions. In accordance with an aspect of the techniques, a calling party issues a request containing a desired security level for a communication session to a called party. The called party receives the request and responds with a provisional response that contains a security level assertion associated with the called party's desired security level for this communication. The calling party receives the provisional response and identifies a security level for the session based on the called party's security level and the calling party's security level. The session is then established at the identified security level.

If the security level of the called party's security level matches or is greater than the security level of the calling party's security level, the called party is allowed to participate in the session and the identified security level for the session is the calling party's security level. If the called party's security level is at a security level that is lower than the security level of the calling party's security level, the identified security level for the session may be downgraded to the called party's security level to allow the called party to participate in the session. The calling party may be notified that the called party's maximum level is below the desired security level for this call, and choose to downgrade the security level using, e.g., a visual or audio indication that indicates the session is being downgraded. Alternatively, if the called party's security level is at a security level that is lower than the security level of the calling party's security level and the session is not to be downgraded to accommodate the called party, the called party may be denied from participating in the communication session. This denial may occur at a call control server prior to the communication signaling reaching the called party. Further, the called party may receive a notification that it is being denied participation in the session.

Advantageously, by taking into consideration security levels associated with parties when establishing communication sessions that involve the parties, the techniques described herein act to provide assurance to a party that other parties participating in a session are cleared to receive information at a particular security level.

Table 1 is an example security classification system that defines relationships between security levels that may be advantageously used to classify sessions and information described herein.

TABLE 1

Security Classification System

| Security Level | Rank |
| --- | --- |
| Top Secret | Highest |
| Secret | Lower than Top Secret but higher than Confidential |
| Confidential | Lower than Secret but higher than Restricted |
| Restricted | Lower than Confidential but higher than Unclassified |
| Unclassified | Lowest |

Referring to Table 1, "top secret" is at the highest level and "unclassified" is at the lowest level. "Restricted" is at a higher level than "unclassified" but is lower in level than "confidential". "Confidential" is at a higher level than "restricted" but is lower in level than "secret". "Secret" is at a higher level than "confidential" but is lower in level than "top secret". Thus, a party associated with an "unclassified" security level is, e.g., only cleared to participate in sessions that are classified at the lowest security level (i.e., "unclassified" sessions) and may not participate in sessions classified at a higher security level, such as "restricted" or "confidential". Likewise, a party that is associated with a "top secret" security level may, e.g., participate in sessions associated at any of the security levels (e.g., "top secret", "secret", "confidential" and so on). It should be noted that other criteria, such as whether a party has an actual need to know information that is to be conveyed in a session, may also be used to determine if a party is actually allowed to participate in the session.

FIG. 1 is a block diagram of an example communication network 100 that may be used with the present invention. Network 100 comprises a collection of communication links 150 interconnecting a plurality of nodes including communication units 200, servers 400 and routers 130 to form an internetwork of nodes. These internetwork nodes communicate by exchanging packets according to a pre-defined set of network protocols, such as the Transmission Control Protocol/Internet Protocol (TCP/IP), the Voice over IP (VoIP) protocol, SAML and SIP. A protocol, as used herein, is a set of formal rules describing, e.g., how to transfer information between two entities in a communication network. The routers 130 are conventional routers configured to form a conventional wide-area network (WAN) 190. The communication units 200 are conventional communication units, such as telephone units, personal digital assists (PDAs), computer systems and the like configured with processing logic described further herein that implements aspects of the novel techniques disclosed herein. The servers 400 are conventional servers configured to, inter alia, process messages (e.g., requests, responses) issued by the communication units 200. It should be noted that the communication network 100 is one example of a network that may be used with the techniques described herein. Other networks, including networks that are more complex than network 100, may be adapted to implement the techniques described herein.

Figure 2:
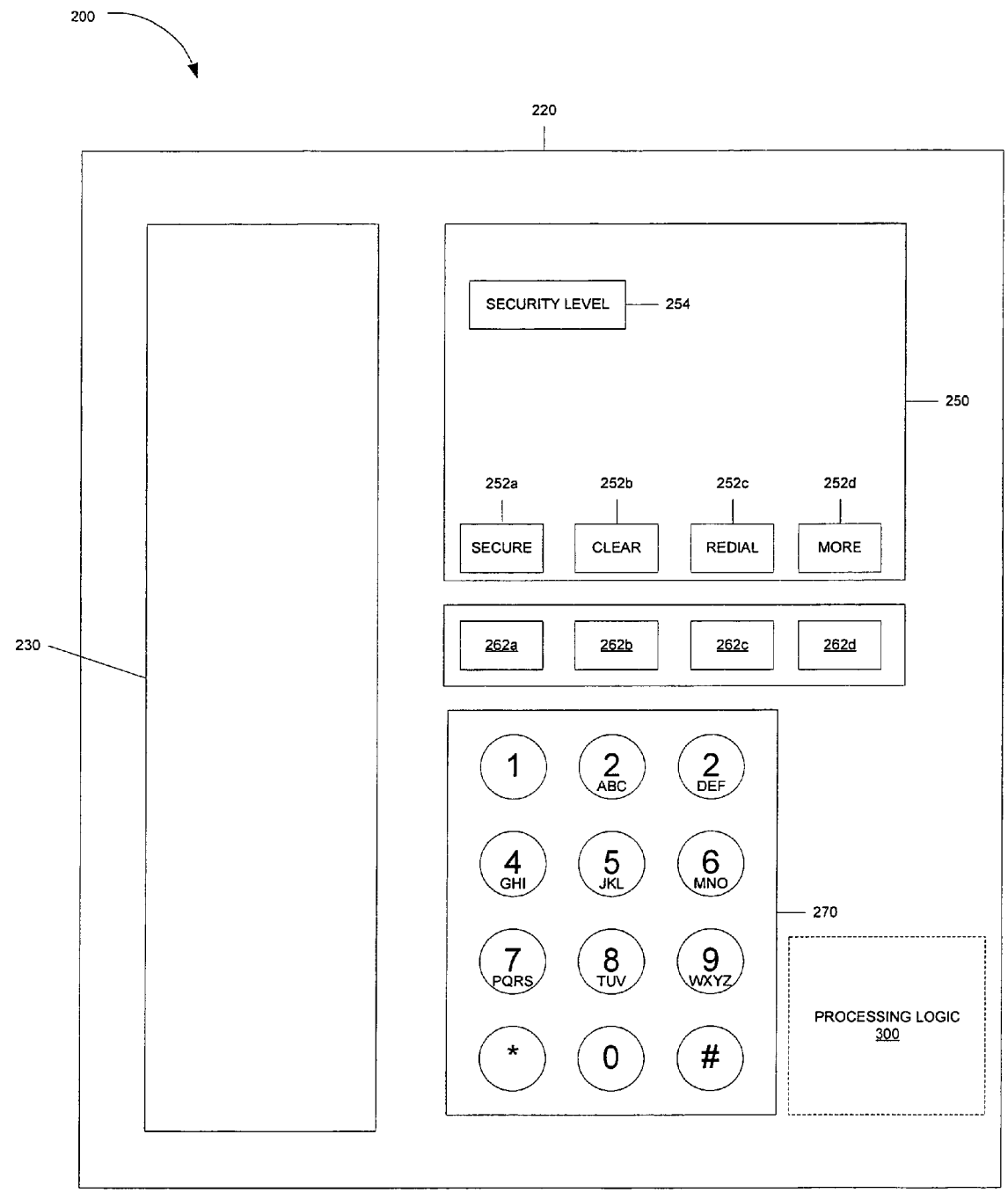
FIG. 2 illustrates an example communication unit that may be used with the techniques described herein.

FIG. 2 is an illustration of an example communication unit 200 that may be used with the techniques described herein. Communication unit 200 is illustratively a telephone comprising a base unit 220, a handset 230, a display unit 250, one or more soft keys 262, a keypad 270 and processing logic 300. The base unit 220 is a conventional base unit configured to enclose the processing logic 300 and provide a platform for the display unit 250, the soft keys 260 and the keypad 270. The base unit also provides a cradle for the handset 230. The handset 230 is a conventional telephone handset comprising circuitry configured to convert between sound waves (audio) and electronic signals that may be further processed by processing logic 300. The handset comprises a conventional microphone (not shown), which may be used to input sound waves (e.g., voice) to the communication unit 200, and a conventional speaker (not shown), which may be used to output sound waves (e.g., voice, tones) from the communication unit 200. An example of a communication unit that may be used with the techniques described herein is the Cisco 7900 series phone available from Cisco Systems Incorporated, San Jose, Calif.

The soft keys 262 are illustratively push buttons that may be programmed to provide various functions, such as specifying security levels (e.g., secret, top secret) for communication sessions, selecting options provided by the unit 200 and so on. The keypad 270 is a conventional keypad that is configured to generate, e.g., standard dual-tone multi-frequency (DTMF) tones as well as enable a user to input information to the communication unit, such as a username and password. The display unit 250 is illustratively a liquid crystal display (LCD) that displays, inter alia, soft key descriptions 252 and statuses 254 of communication sessions (e.g., calls) handled by the unit 200. These statuses may include, e.g., text or graphics that indicate a security level (security level) of a communication session and/or security levels of users associated with a session. Moreover, audio signals (e.g., tones, voice) may be played by the communication unit 200 to indicate these security levels.

Figure 3:
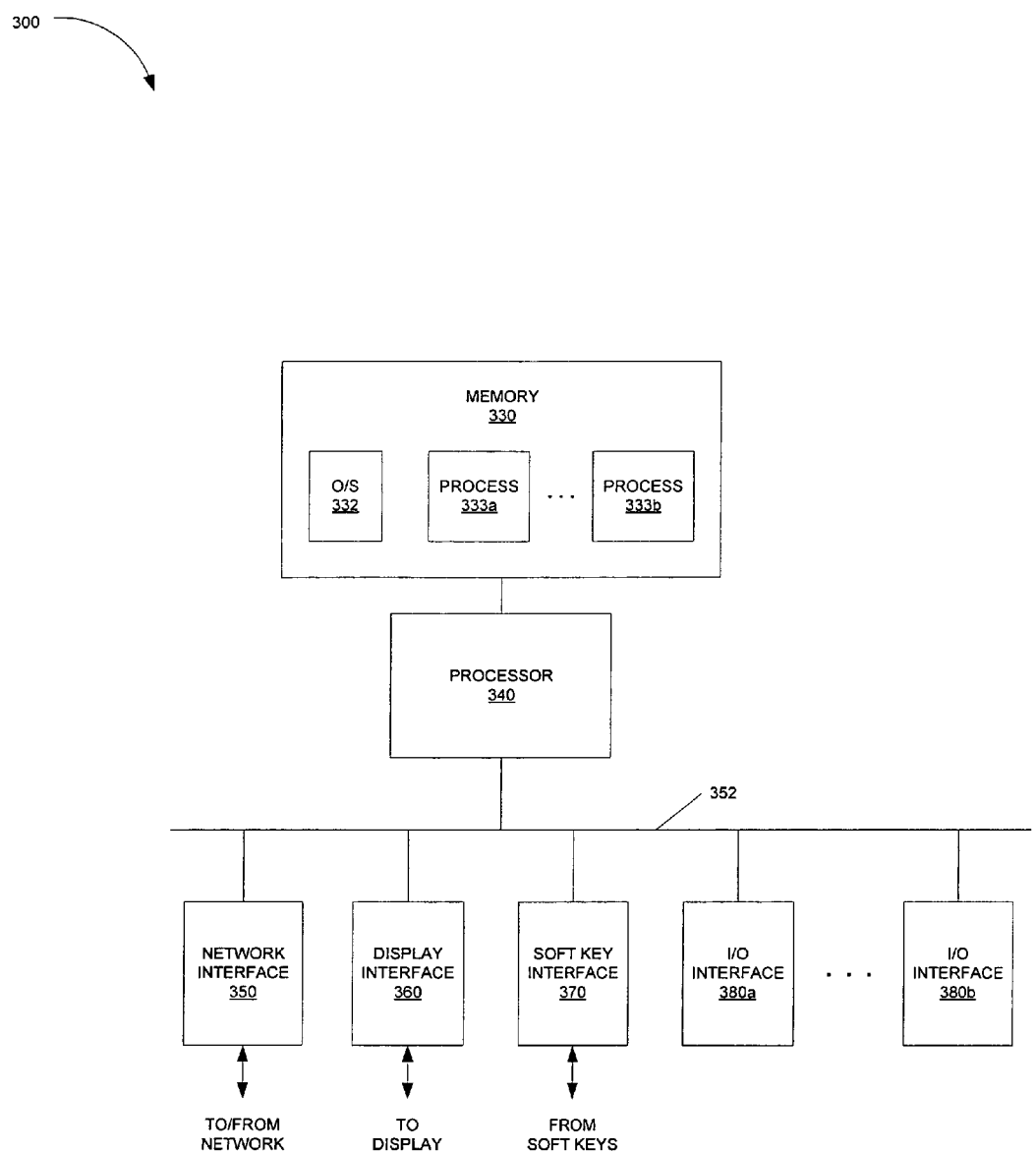
FIG. 3 illustrates example processing logic for a communication unit that may be used with the techniques described herein.

FIG. 3 is a high-level block diagram of example processing logic 300 that may be used with aspects of the techniques described herein. Processing logic 300 comprises a memory 330 coupled to a processor 340 which is coupled to various interfaces via an input/output (I/O) bus 352. These interfaces may include a network interface 350, a display interface 360, a soft key interface 370 and I/O interfaces 380. The processor 340 is a conventional central processing unit (CPU) comprising processing circuitry that is configured to, inter alia, execute various instructions and manipulate data structures contained in memory 330.

Network interface 350 is a conventional network interface comprising circuitry configured to interface the communication device 200 with the network 100 and enable information (e.g., data) to be transferred between the communication device 200 and the network 100. To that end, network interface 350 incorporates signal, electrical and mechanical characteristics, and interchange circuits, needed to interface with the physical media of the network 100 and protocols running over that media.

The display interface 360 comprises circuitry configured to interface the display 350 with the processor 340 and enable signals and information, such as soft key descriptions 252 and status information 254, to be transferred between the processor and the display 350. The soft key interface 370 comprises circuitry that interfaces the soft keys 262 with the processor 340 and enables the processor 340, e.g., to determine, if a particular soft key 262 has been selected. The I/O interfaces 380 comprise logic that interfaces various input and/or output devices, such as keypad 270 and handset 230, with the processor 340 and enable signals and information to be transferred between the devices and the processor 340.

The memory 230 is a computer-readable medium organized as a random access memory (RAM) that is illustratively implemented using RAM devices. These devices may comprise some combination of non-volatile memory devices, such as flash memory devices, and volatile devices, such as Dynamic RAM (DRAM) devices. The memory 230 is configured to hold various computer-executable instructions and data structures including computer-executable instructions and data structures that implement aspects of the techniques described herein.

The memory comprises an operating system (O/S) 332 and one or more processes 333. The operating system 332 is illustratively a conventional operating system that is configured to implement various conventional operating system functions, such as task and process scheduling, as well as memory management and controlled access to various devices, such as display 250 and soft keys 262. The processes 333 may comprise computer-executable instructions and data that are configured to implement various aspects of the techniques described herein.

Figure 4:
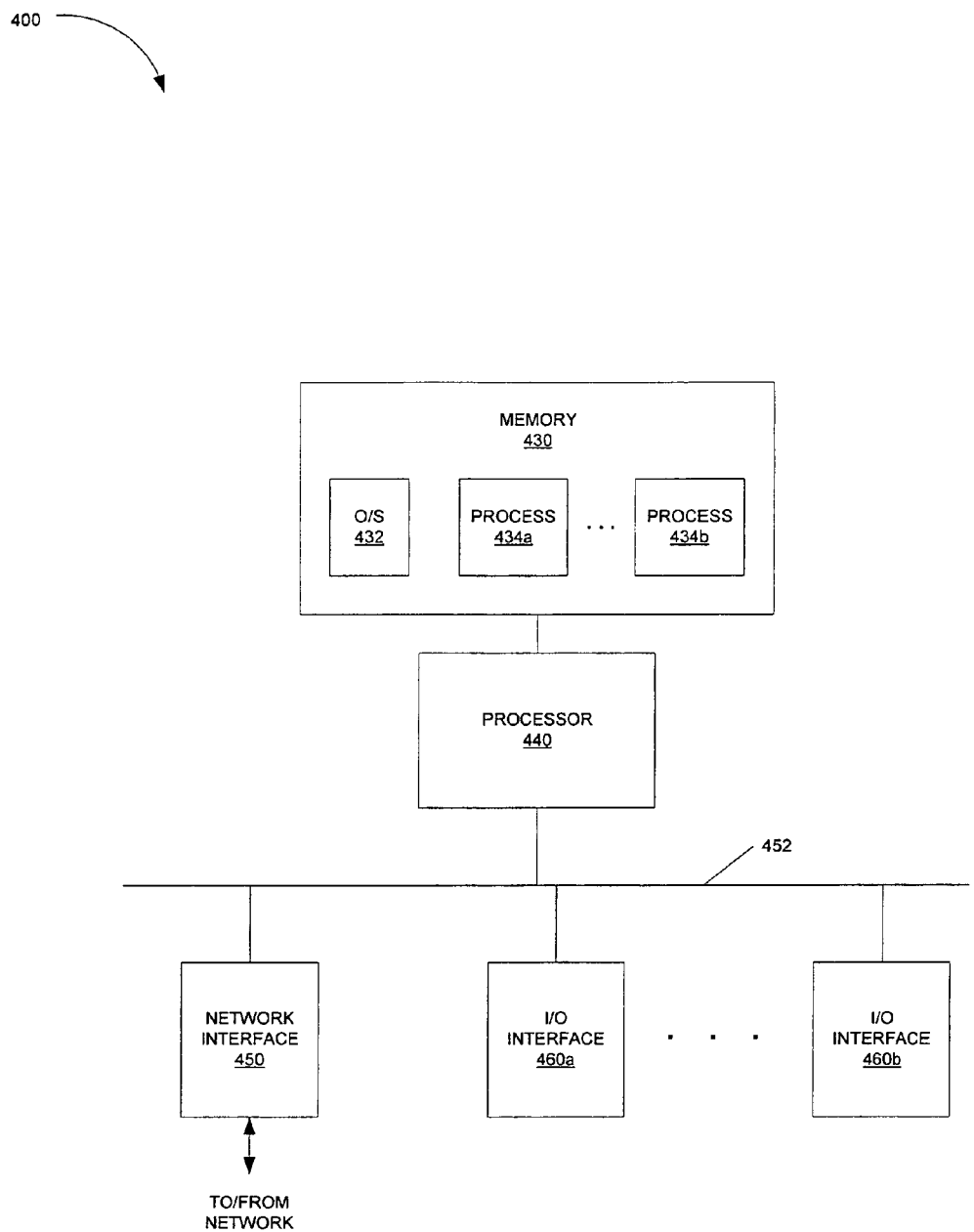
FIG. 4 illustrates an example server that may be used with the techniques described herein.

FIG. 4 is a high-level block diagram of an example server 400 that may be used with the techniques described herein. Server 400 comprises a memory 430 that is coupled to a processor 440 that is also coupled to a network interface 450 and one or more I/O interfaces 460 via an I/O bus 452.

The network interface 450 is a conventional network interface comprising circuitry that illustratively interfaces the server 400 with the network and enables information to be transferred between the server 400 and the network 100. To that end, network interface 450 incorporates signal, electrical and mechanical characteristics, and interchange circuits, needed to interface the server 400 with the physical media of the network 100 and protocols running over that media.

The processor 440 is a conventional CPU comprising processing circuitry configured, inter alia, to execute computer-executable instructions and manipulate data contained in memory 430. The I/O interfaces 460 comprise circuitry that interface various input and/or output devices (not shown) with the processor 440, such as, e.g., keyboards, display units and the like. The memory 430 is a computer-readable medium organized as a RAM that is implemented memory devices which may be some combination of volatile and non-volatile devices, as described above. The memory is configured to hold computer-executable instructions and data structures including computer-executable instructions and data structures that implement aspects of the present invention.

The memory 430 illustratively contains an operating system 432 and one or more processes 434. The operating system 432 is a conventional multi-tasking operating system configured to implement various conventional operating system functions which may include scheduling processes 434 for execution, managing memory 430 and controlling access to devices coupled to the I/O interfaces 460. The processes are conventional software processes that contain computer-executable instructions and data that may implement aspects of the techniques described herein.

Operationally, information (e.g., data packets containing messages, voice data, etc.) that is generated by a communication unit 200 is forwarded onto the network 100 via the communication unit's network interface 350. Likewise, information (e.g., data packets) is received from the network 100 by a communication unit 200 at its network interface 350 and may be transferred to the processor 340 for further processing. This processing may include generating status information that is displayed on display 250. Information input via the keypad 270 is transferred to the processor 340 via an I/O interface 380. Likewise, information about soft keys that are selected, e.g., by a user, is transferred to the processor 340 via soft key interface 370.

A server 400 receives information (e.g., data packets) from the network 100 at its network interface 450 which forwards the information to the processor 440 for further processing. Processor 440 processes the information which may include generating responses, forwarding information onto the network 100 via network interface 450 to another node in the network 100, checking authorization of users associated with the information and so on.

It should be noted that functions performed by the communication units 200 and the servers 400, including functions that implement aspects of the techniques described herein, may be implemented in whole or in part using some combination of hardware and/or software. It should be further noted that computer-executable instructions and/or data that implement aspects of the techniques described herein may be stored in various computer-readable mediums, such as flash memories, removable disks, non-removable disks and the like. In addition, it should be noted that various electromagnetic signals such as wireless signals, electrical signals carried over a wire, optical signals carried over optical fiber and so on may be encoded to carry computer-executable instructions and/or data that implement aspects of the present invention on, e.g., a communication network.

Figure 5:
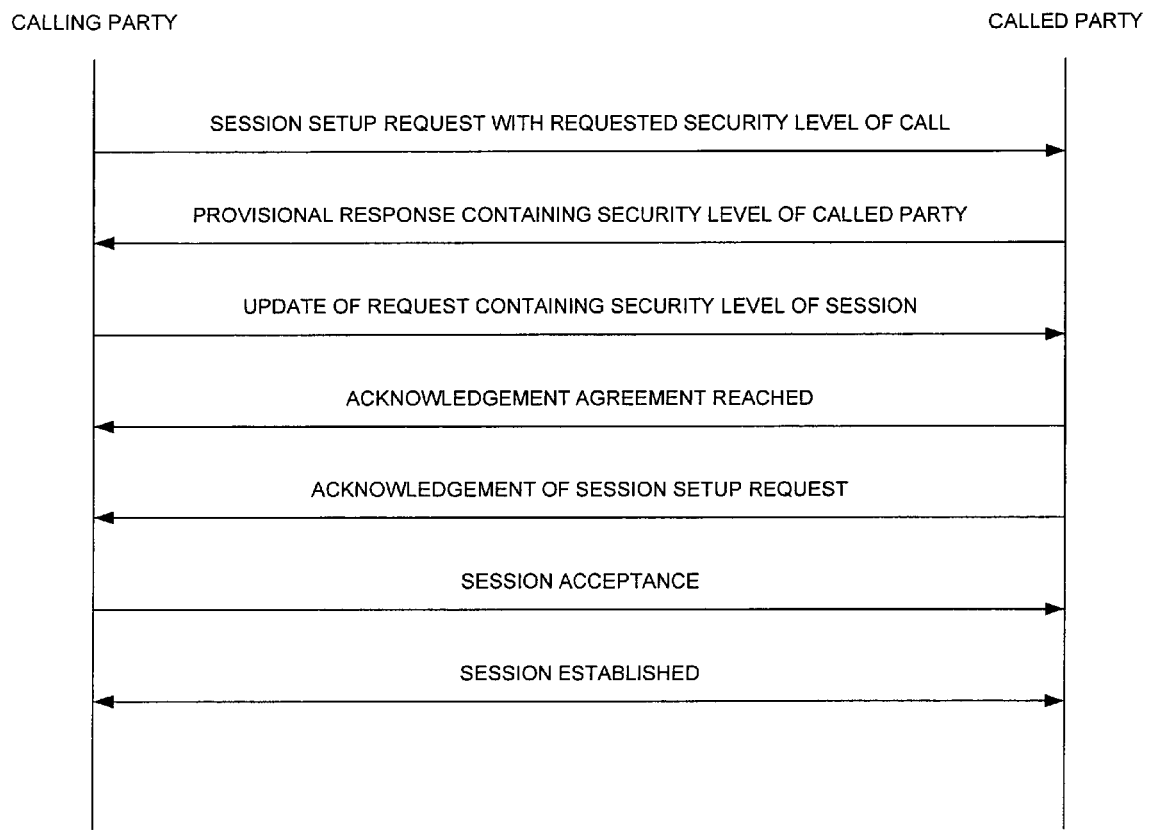
FIG. 5 illustrates an example dialog between a calling party and a called party that may be used to establish a communication session between the parties.

In accordance with aspects of the techniques described herein, dialogs comprising an exchange of requests and responses (e.g., SIP requests and responses) may be used to establish communication sessions between parties. FIG. 5 illustrates a dialog that may be used to establish a secure communication session between a calling party and a called party in accordance with the techniques described herein.

Referring to FIG. 5, the session begins when the calling party generates a session setup request that contains a desired security level for the session. The calling party then forwards the session setup request to the called party. The called party (1) receives the session setup request, (2) examines the security level contained therein, (3) identifies a security level associated with the called party based on the security level contained in the session setup request, (4) generates a provisional response containing the security level of the called party and (5) forwards the provisional response to the calling party.

The calling party receives the provisional response and uses the security level specified in the provisional response and the security level specified in the call setup request to identify a security level for the session. Illustratively, if the security level specified in the provisional response matches or is at a higher level than the security level specified in call setup request, the identified security level for the session is the security level specified in the call setup request. For example, if a security level specified in a call setup request is "secret" and a security level specified in a provisional response is "top secret", the identified security level for the session would be the security level associated with the call setup request which is "secret" because the security level specified in the provisional response is at a greater level than the security level specified in the call setup request.

Also, illustratively, if the security level specified in the provisional response is lower than security level specified in the call setup request, the identified security level for the session may be downgraded to the security level specified in the provisional response. Alternatively, a notification (e.g., error message) may be generated and forwarded to the called party to notify the called party that the security level specified in the provisional response does not match or is less than the security level requested for the session and further establishment of the session is being abandoned. Thus, for example, if the security level specified in the call setup request is "top secret" and the security level specified in the provisional response is "secret", the identified security level for the session may be downgraded to "secret", to allow the called party to participate in the session. Alternatively, for example, the called party may receive a notification that the session is not established.

Assuming that establishment of the secure communication session is to proceed, an update of the session setup request is generated containing the identified security level for the session and the update message is forwarded to the called party. The called party receives the update of the session setup request and responds with an acknowledgement indicating that an agreement of the security level of the call has been reached. The called party also generates and forwards an acknowledgement of the session setup request to the calling party.

The calling party receives the acknowledgement that the agreement has been reached and the acknowledgement of the session setup request, and generates a session acceptance message that is forwarded to the called party. The called party receives the session acceptance message and concludes that the session has been established. At this point the session is considered established.

For example, referring to FIGS. 1 and 5, assume a user (calling party) at communication unit 200*a* wishes to establish a "top secret" communication session (e.g., a telephone call) with another user (called party) at communication unit 200*b* in accordance with the techniques described herein using the SIP protocol. Further, assume that the calling party is cleared to participate in sessions up to a "top secret" security level and the called party is only cleared to participate in sessions up to a "secret" security level. In addition, assume both the security levels are ranked per the security classification system described above in Table 1.

Communication unit 200a generates a SIP INVITE message containing a setup request that specifies security level for the session is "top secret". The communication unit 200a then forwards the INVITE message to communication unit 200b. The INVITE message travels via network 100 to communication unit 200b which receives the INVITE message, examines the security level contained therein and generates a SIP 200 OK message (provisional response) that specifies the security level associated with the called party at communication unit 200b. Communication unit 200b then forwards the SIP 200 OK message via the network 100 to communication unit 200a.

Communication unit 200a receives the SIP 200 OK message, examines the security level of the called party contained therein and determines that the called party's security level is at a lower security level than the security level requested by the calling party. Communication unit 200a may then indicate this discrepancy on the communication unit's display 250, e.g., as a status 254 indication. In addition, communication unit 200a may provide an audible indication of this discrepancy. The communication unit 200a may then use the display 250 to query the calling party to determine if the calling party wishes to downgrade the security level of the session to that of the called party's security level or cancel the session altogether. The communication unit 200a may provide a soft key 262 that enables the calling party to specify whether he wishes to, e.g., downgrade the security level of the session or cancel it altogether.

Assuming the calling party chooses to downgrade the session, the communication unit 200a generates a SIP UPDATE message containing the new security level of the downgraded session and forwards the UPDATE message to communication unit 200b. Communication unit 200b receives the UPDATE message, examines the security level contained therein, generates a SIP 200 OK message indicating that an agreement has been reached with regards to the security level of the session and forwards the 200 OK message to communication unit 200a. In addition, communication unit 200b generates a SIP 200 OK message to acknowledge the INVITE message and forwards the 200 OK message to communication unit 200a.

Communication unit 200a receives both 200 OK acknowledgement messages, generates a SIP ACK message to indicate the session is accepted and forwards the ACK message to communication unit 200b. Communication unit 200b receives the ACK message and concludes that the secure communication session between the calling party and the called party has been established at the agreed upon security level. The session is then considered established between the communication units 200a, 200b.

Figure 6A:
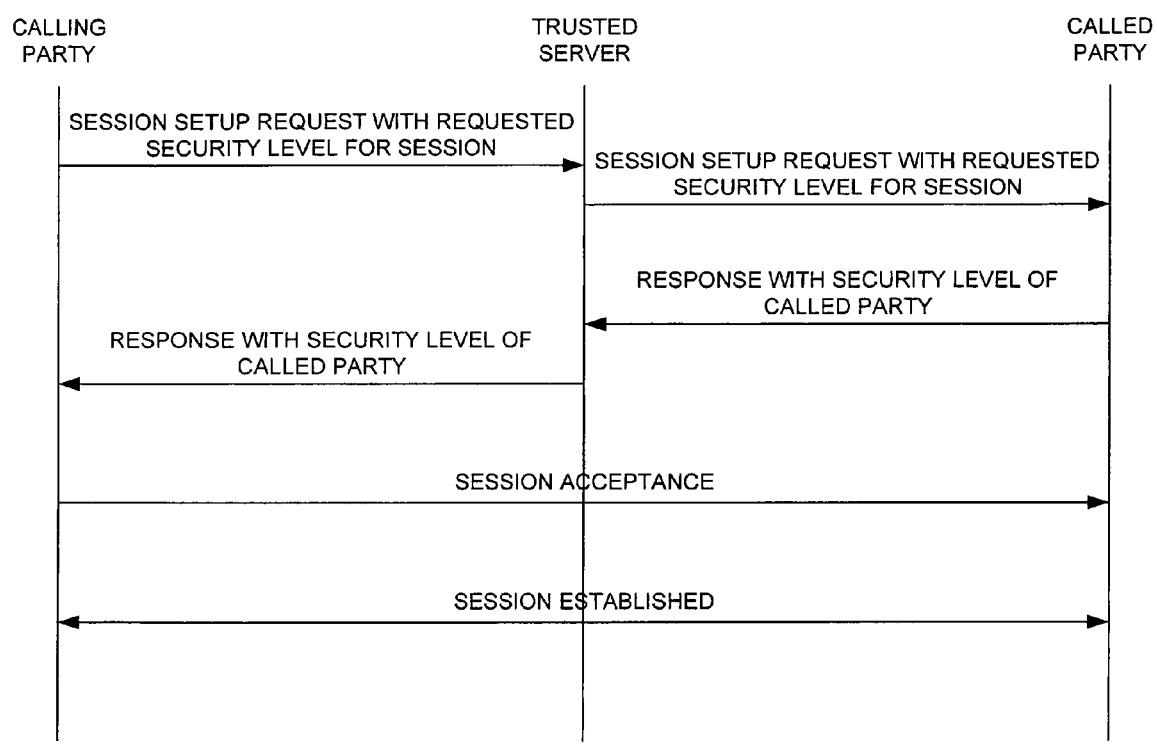
FIGS. 6A-B illustrate dialogs between a calling party and a called party that may be used to establish a communication session using a single trusted server.
Figure 6B:
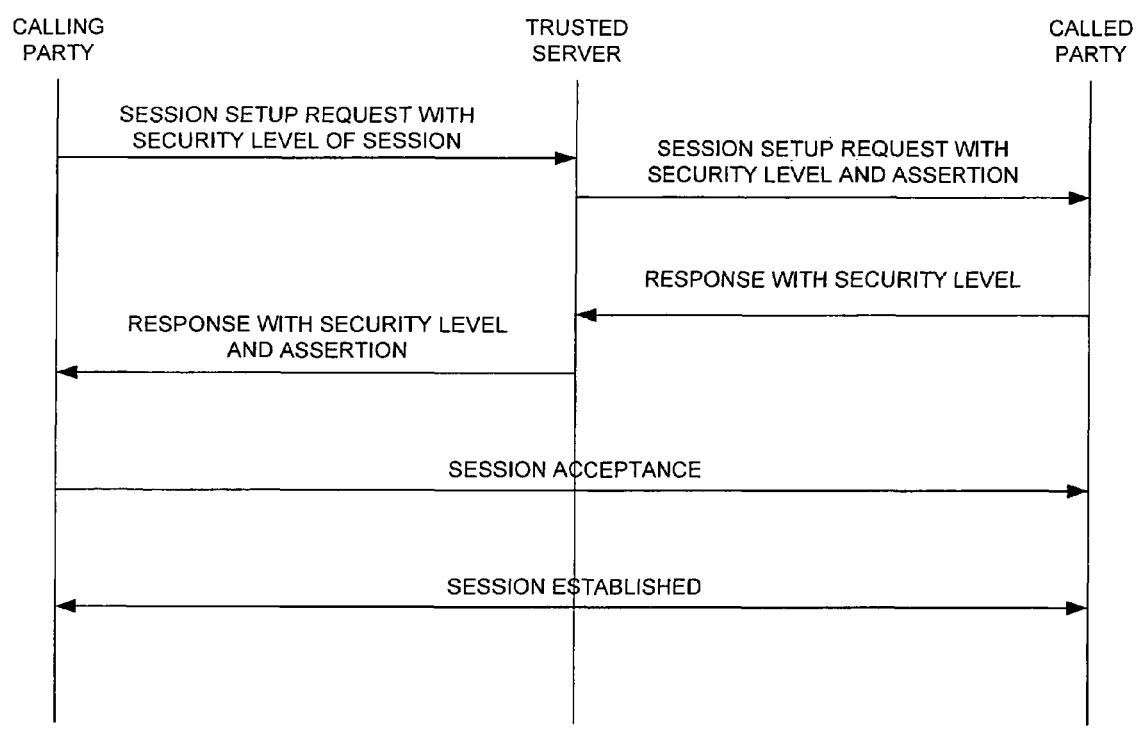

FIGS. 6A-B are illustrations of dialogs that may be used to establish secure communication sessions between a calling party and a called party in accordance with the techniques described herein using a single trusted server. The trusted server is an entity that is trusted by each party to, e.g., authenticate parties, provide/verify assertions made by the parties and so on.

Referring to FIG. 6A, establishment of a session begins with the calling party generating a session setup request containing a security level for the session and forwarding the request to the trusted server. The trusted server receives the request and verifies that the calling party is authorized to participate in a session at the security level requested by the calling party. This authorization may include, e.g., using credentials (e.g., username, password, secure token, access code, etc.) provided by the calling party in the request to verify the party's identity. Assuming that the calling party is authorized to establish a secure session at the requested security level, the server forwards the setup request to the called party. The called party (1) receives the session setup request and processes it including examining the requested security level for the session, (2) generates a response containing the called party's security level and (3) forwards the response to the server.

The server receives the response and verifies that the called party is authorized to participate in a session at the security level contained in the response, as described above. Assuming the called party is authorized to participate in a session at the security level, the server forwards the response to the calling party. The calling party receives the response with the called party's security level and processes it including identifying a security level for the session, as described above, generating a session acceptance message containing an identified security level and forwarding the session acceptance message via the server to the called party.

The called party receives the session acceptance message and assumes the session is established at the security level indicated in the message. Note that if the security level of the called party is unacceptable to the calling party, the calling party may generate and forward a notification (e.g., error message) to the called party to indicate that an agreement as to the security level of the session has not been reached and that further establishment of the session is being abandoned.

FIG. 6B illustrates a dialog that is similar to the dialog illustrated in FIG. 6A except that the dialog in FIG. 6B utilizes assertions to assert that a party is authorized to participate in sessions at a particular security level. An assertion provides an indication that may be used, e.g., to assert the identity of a party and assert that a party is authorized to participate in a session at a particular security level. An example of an assertion may be a digital signature that is used to assert the identity of a particular party. The digital signature in combination with a security level may be used to assert the identity of a party and a security level associated with the party. SAML is an assertion XML schema; therefore, if SAML is included in an encrypted message that is digitally signed, the message is both secure, and the assertion is integrity protected.

Referring to FIG. 6B, establishment of a session begins with the calling party generating a session setup request containing a security level for the session and forwarding the request to the trusted server. The trusted server (1) receives the request, (2) verifies that the calling party is authorized to establish the session at the requested security level, (3) identifies an assertion associated with the calling party that indicates the calling party is authorized to participate in sessions at the requested security level, (4) places the assertion in the session setup request and (5) forwards the session setup request to the called party.

The called party receives the session setup request containing the security level and the assertion and processes it including verifying that the assertion is true. As used herein, if an assertion is true, the assertion is deemed accepted. Also, as used herein, if an assertion is accepted, the assertion is deemed to be true. Illustratively, the called party may verify the assertion is true by comparing it with known good assertions accessible to the called party. Alternatively, the called party may request verification of the assertion from another entity in a data network, such as another trusted server. Assuming the assertion has been accepted, the called party generates a response containing a security level of the called party and forwards the response to the trusted server.

The trusted server receives the response and verifies that the called party is authorized to participate in a session at the security level contained in the response. Assuming the called party is authorized to participate in a session at the security level contained in the response, the trusted server identifies an assertion for the called party that, e.g., identifies the called party and indicates the called party is authorized to participate in a session at the security level specified in the response. The server places the identified assertion in the response and forwards the response to the calling party.

The calling party receives the response with the called party's security level and assertion and processes it including verifying the assertion is true, as described above, and identifying a security level for the session, as described above. The calling party then generates a session acceptance message containing the identified security level for the session and forwards the session acceptance message to the called party. The called party receives the session acceptance message and concludes the session is established at the security level indicated in the message. As noted above, if the security level and/or assertion of the called party are unacceptable to the calling party, the calling party may generate and forward a notification (e.g., error message) indicating such.

For example, referring to FIGS. 1 and 6B, assume, as above, a user (calling party) at communication unit 200a wishes to establish a "top secret" communication session with another user (called party) at communication unit 200b in accordance with the techniques described herein using the SIP and SAML protocols. Further, assume, as above, that the calling party is cleared to participate in sessions up to a "top secret" security level and the called party is only cleared to participate in sessions up to a "secret" security level which is a less secure security level than the calling party's "top secret" security level. In addition, assume that server 400b is a trusted server that is trusted by both the calling party and the called party.

Communication unit 200a generates a SIP INVITE message that contains the requested security level for the session (i.e., "top secret") and credentials associated with the calling party. Communication unit 200a then forwards the INVITE message to communication unit 200b. The INVITE message travels via network 100 and is received by node 400b. Server 400b processes the INVITE message including verifying the calling party's credentials contained in the message to authenticate the calling party. Assuming the calling party has been authenticated, node 400b examines the security level contained in the INVITE message and determines if the calling party is authorized to participate in sessions at the requested security level. Assuming the calling party is authorized to participate in sessions at the requested security level, node 400b identifies an assertion for the calling party that indicates the calling party is authentic and is authorized to participate in sessions at the requested security level, places the assertion in the INVITE message in the form of a SAML assertion and forwards the INVITE message containing the assertion to communication unit 200b.

The message travels via network 100 to communication unit 200b which receives the INVITE message and processes it including verifying the assertion contained in the message. Assuming the assertion is true, communication unit 200b generates a SIP 200 OK message containing credentials and a security level associated with the called party and forwards the 200 OK message to communication unit 200a. The 200 OK message travels via the network 100 and is received by server 400b.

Server 400b verifies the called party's credentials and security level contained in the message, as described above. Assuming the credentials and security level are accepted, server 400b identifies an assertion that identifies the called party and indicates the called party is authentic and authorized to participate in a session at the called party's security level, and places the assertion in the 200 OK message in the form of a SAML assertion. Server 400b then forwards the 200 OK message to communication unit 200a.

Communication unit 200a receives the 200 OK message and processes it including verifying the called party's assertion, as described above. Assuming that the called party's assertion is accepted, communication unit 200a examines the security level of the called party contained in the message and determines that the called party's security level is a lower security level than the security level requested by the calling party. Communication unit 200a may then indicate this discrepancy to the calling party by displaying a status 254 on its display 250 that indicates the called party is authorized to participate in at most a "secret" level session. The communication unit 200a may also display information on the display 250 that queries the calling party to determine if the calling party wishes to downgrade the security level of the session to that of the called party's security level. The communication unit 200a may further provide a soft key 262 that enables the calling party to specify whether the calling party wishes to, e.g., downgrade the security level of the session or cancel it altogether.

Assuming the calling party chooses to downgrade the session, the communication unit 200a generates a SIP ACK (acknowledgement) message that indicates an agreement has been reached with regards to the security level of the session and forwards the ACK message to communication unit 200b. The ACK message may contain the agreed upon security level of the session which in this case is the security level of the called party (i.e., "secret"). Communication unit 200b receives the ACK and concludes that the communication session between the calling party and the called party has been established at the agreed upon security level. At this point, the session is considered established between the two parties.

Figure 7:
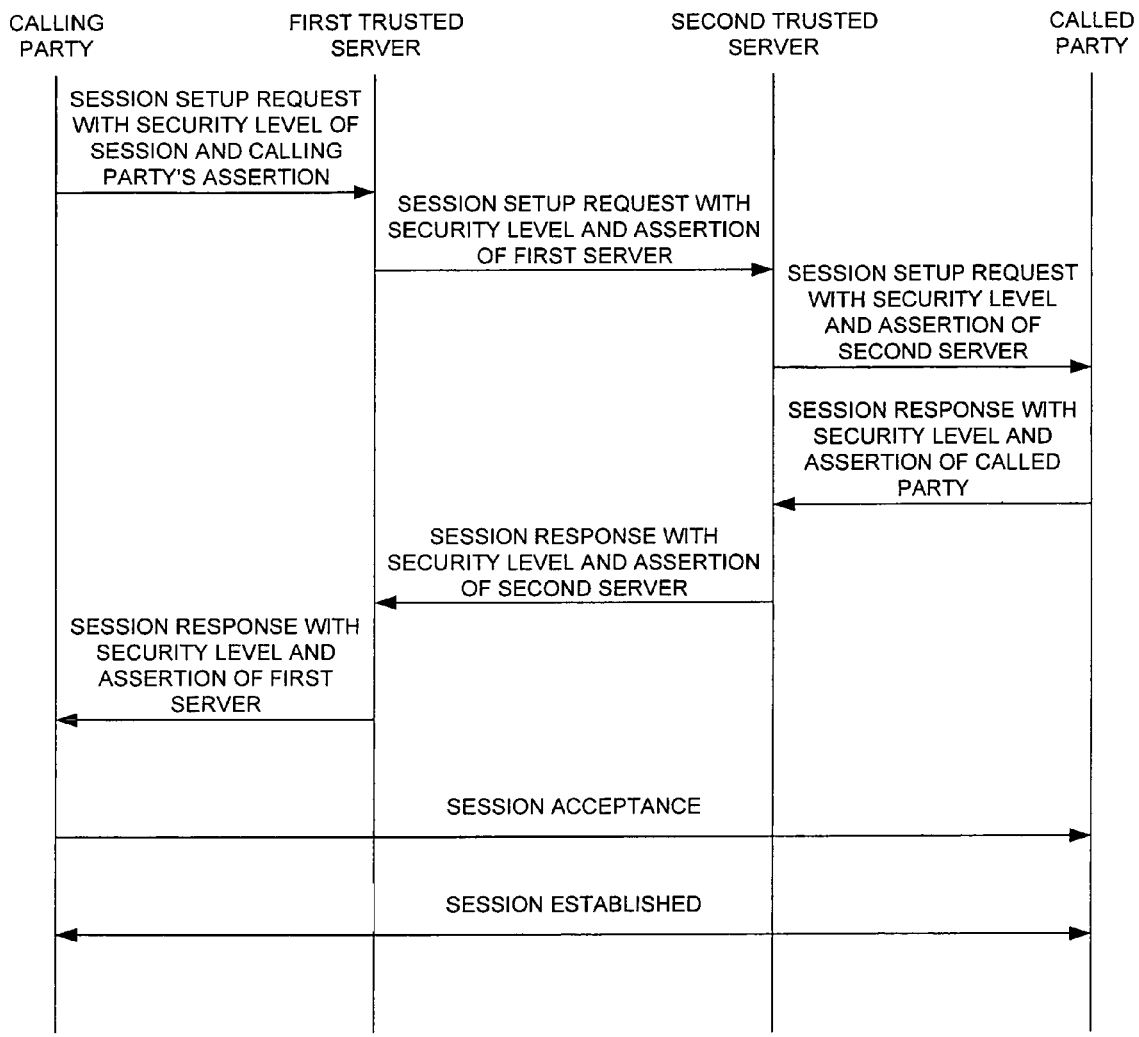
FIG. 7 illustrates an example dialog between a calling party and a called party that may be used to establish a communication session utilizing multiple trusted servers.

FIG. 7 illustrates a dialog between a calling party and a called party that may be used to establish a communication session between the parties in accordance with the techniques described herein utilizing two trusted servers. Here, trust relationships are established between the calling party and a first trusted server, the first trusted server and a second trusted server, and the second trusted server and the called party.

Referring to FIG. 7, the session begins where the calling party generates a session setup request containing a requested security level for the session and an assertion that, e.g., identifies the calling party and indicates the calling party is authorized to participate in a session at the requested security level. The calling party forwards the session setup request to the called party. The first trusted server receives the session setup request and verifies the calling party's assertion.

Assuming the calling party's assertion is true, the first server replaces the calling party's assertion in the session setup request with an assertion that is trusted between the first and second servers and that, e.g., identifies the calling party and indicates the calling party is authorized to participate in a session at the requested security level. The first server then forwards the request to a second server which verifies that the assertion made by the first server is true. Assuming the assertion is true, the second server replaces the first server's assertion in the setup request with an assertion that is trusted between the second server and the called party and that, e.g., identifies the calling party and indicates the calling party is authorized to participate in a session at the requested security level. The second server then forwards the setup request to the called party. The called party receives the request and verifies that the assertion made by the second server is true.

Assuming the assertion is true, the called party generates a response that specifies a security level associated with the called party and an assertion that, e.g., identifies the called party and indicates the called party is authorized to participate in a session at the called party's specified security level. The called party then forwards the response to the calling party. The second server receives the response and verifies the assertion made by the called party is true. Assuming the assertion is true, the second server then replaces the assertion in the response with an assertion that is trusted between the first and second servers that, e.g., identifies the called party and indicates the called party is authorized to participate in a session at the called party's specified security level. The second server then forwards the response to the first server.

The first server receives the response containing and verifies that the second server's assertion is true. Assuming that the second server's assertion is true, the first server replaces the second server's assertion in the response with an assertion that is trusted between the first server and the calling party and that, e.g., identifies the called party and indicates the called party is authorized to participate in a session at the called party's specified security level. The second party then forwards the response to the calling party. The calling party receives the response and verifies the first server's assertion, as described above.

Assuming the first server's assertion is accepted, the calling party uses the called party's security level to identify a security level for the session, as described above. Assuming a security level for the session is identified and that the session is to proceed, the calling party then generates a session acceptance message that contains the identified security level and forwards the session acceptance message to the called party. The called party receives the session acceptance message and assumes that the session is established at the identified security level.

For example, referring to FIGS. 1 and 7, assume, as above, a user (calling party) at communication unit 200a wishes to establish a "top secret" communication session with another user (called party) at communication unit 200b in accordance with the techniques described herein using the SIP and SAML protocols. Further, assume, as above, that the calling party is cleared to participate in sessions up to a "top secret" security level and the called party is only cleared to participate in sessions up to a "secret" security level. In addition, assume that server 400b is the first trusted server and server 400c is the second trusted server.

The session begins with communication unit 200a generating a SIP INVITE message that specifies the requested security level for the session (i.e., "top secret") and a SAML assertion associated with the calling party that identifies the calling party and indicates that the calling party is authorized to participate in sessions at a "top secret" security level. Communication unit 200a then forwards the INVITE message to communication unit 200b.

The INVITE message is received by server 400b which verifies the assertion, as described above. Assuming the calling party's assertion is true and accepted by server 400b, server 400b replaces the assertion with another assertion that is trusted between server 400b and server 400c and that identifies the calling party and indicates the calling party is authorized to participate in a "top secret" session. Server 400b then forwards the INVITE message to server 400c.

Server 400c receives the INVITE message and verifies the assertion placed in the message by server 400b. Assuming that the assertion is true and accepted by server 400c, server 400c replaces the assertion with an assertion that is trusted between server 400c and communication unit 200b that identifies the calling party and indicates the calling party is authorized to participate in a "top secret" session. Server 400c then forwards the INVITE message to communication unit 200b.

Communication unit 200b receives the INVITE message and verifies the assertion contained therein, as described above. Assuming the assertion is true and accepted by communication unit 200b, communication unit 200b generates a SIP 200 OK message containing the security level associated with the called party (i.e., "secret" security level) and a SAML assertion that identifies the called party and indicates the called party is authorized to participate in sessions at the specified security level as a provisional response to the INVITE message, and forwards the 200 OK message to communication unit 200a.

Server 400c receives the 200 OK message and verifies the assertion contained therein, as described above. Assuming the called party's assertion is true and accepted by server 400c, server 400c replaces the assertion with another assertion that is trusted between server 400b and server 400c that identifies the called party and indicates the called party is authorized to participate in "secret" sessions. Server 400c then forwards the 200 OK message to server 400b.

Server 400b receives the 200 OK message and verifies the assertion contained therein, as described above. Assuming that the assertion is true and accepted by server 400b, server 400b replaces the assertion with an assertion that is trusted between server 400b and communication unit 200a, and that identifies the called party and indicates the called party is authorized to participate in "secret" sessions. Server 400b then forwards the 200 OK message to communication unit 200a.

Communication unit 200a receives the 200 OK message and verifies the assertion contained therein, as described above. Assuming the assertion is true and accepted by communication unit 200a, communication unit 200a uses security level to identify a security level for the session, as described above. Communication unit 200a then generates a SIP ACK message containing the identified security level in the ACK message and forwards the message to the called party. The called party receives the ACK message and concludes the session has been established between the parties at the security level specified in the message.

Figure 8:
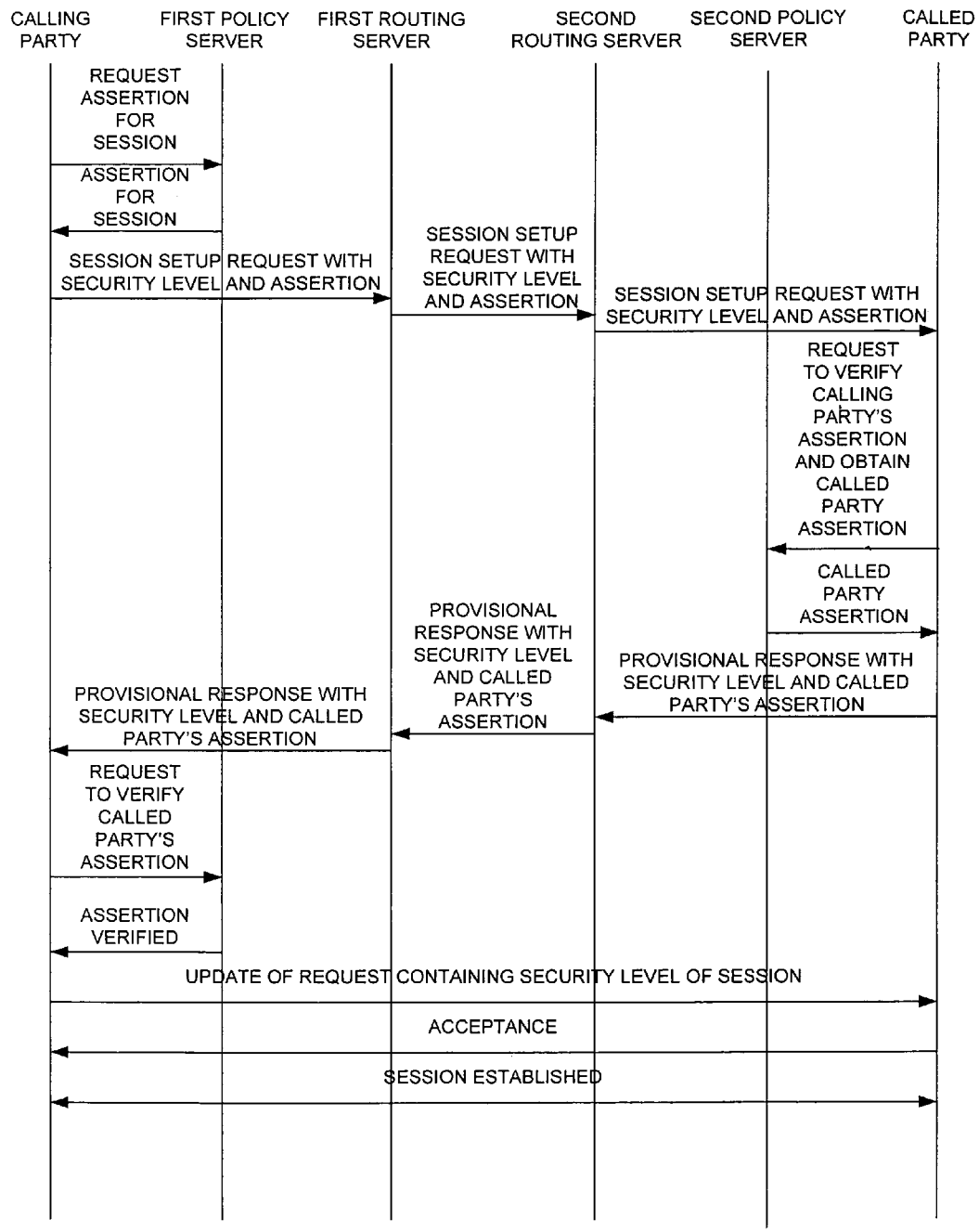
FIG. 8 illustrates an example dialog between a calling party and a called party that may be used to establish a communication session utilizing multiple trusted servers and policy servers.

FIG. 8 illustrates a dialog between a calling party and a called party that may be used to establish a session between the parties in accordance with the techniques described herein utilizing multiple routing servers and multiple policy servers. The routing servers are illustratively utilized to route messages (e.g., SIP messages) between the parties and the policy servers are illustratively utilized to enforce various policies with respect to the parties. These policies may include authenticating identities of parties as well as determining if parties are authorized to participate in sessions at particular security levels. Trust relationships are established between the first policy server and the calling party and the second policy server and the called party, as described above.

Referring to FIG. 8, the calling party generates a request for an assertion that, e.g., identifies the calling party and indicates the calling party is authorized to participate in a session at a security level that is requested for the session. The request may contain the security level and credentials of the calling party which may be used by the policy server to authenticate the calling party as well as determine if the calling party is authorized to participate in a session at the specified security level. The calling party forwards the request to the first policy server.

The first policy server receives the request, verifies the identity of the calling party and verifies the calling party is authorized to participate in a session at the requested security level. Assuming the calling party's identity is verified and the calling party is authorized to participate in a session at the requested security level, the first policy server generates a response containing an assertion that, e.g., identifies the calling party and indicates the calling party is authorized to participate in a session at a security level that is requested for the session. The first policy server forwards the response to the calling party.

The calling party receives the response, generates a session setup request containing the requested security level of the secure communications session and the assertion contained in the response and forwards the session setup request to the called party. The first routing server receives the session setup request and forwards it to the second routing second routing server. The second routing server receives the session setup request and forwards it to the called party.

The called party receives the session setup request and generates a request to verify the calling party's assertion and acquire an assertion for the called party that, e.g., identifies the called party and indicates the called party is authorized to participate in a session at a security level that is specified by the called party. The request may include the assertion made by the calling party, the called party's security level and credentials which may be used to identify the called party. The called party forwards the request to the second policy server.

The second policy server receives the request, authenticates the called party using information contained therein and verifies that the called party is authorized to participate in a session at the security level specified in the request. Assuming the called party's identity is authenticated and the calling party is authorized to participate in a session at the called party's security level, the second policy server identifies an assertion for the called party, generates a response containing the identified assertion and forwards the response to the called party.

The called party receives the response and generates a provisional response to the session setup request that contains the called party's security level and the called party's assertion, and forwards the provisional response to the calling party. The second routing server receives the provisional response and forwards it to the first routing server. The first routing server receives the provisional response and forwards it to the calling party.

The calling party receives the provisional response and verifies the called party's assertion contained therein, as described above. Assuming the assertion is true, 5 the calling party identifies a security level for the session, as described above. The calling party then generates an updated request containing the identified security level and forwards the updated request to the called party. The called party receives the updated request, concludes the session is established at the security level specified therein, generates an acceptance and forwards the acceptance to the calling party. The calling party receives the acceptance and concludes the session has been successfully established.

For example, referring to FIGS. 1 and 8, assume, as above, a user (calling party) at communication unit 200a wishes to establish a "top secret" communication session with another user (called party) at communication unit 200b in accordance with the techniques described herein using the SIP and SAML protocols. Further, assume, as above, that the calling party is cleared to participate in sessions up to a "top secret" security level and the called party is only cleared to participate in sessions up to a "secret" security level. In addition, assume that server 400a and server 400b act as a policy server and a routing server, respectively, for communication unit 200a and that server 400d and server 400c act as a policy server and a routing server, respectively, for communication unit 200b.

Communication unit 200a generates a SIP INVITE request that contains credentials that identity the calling party and that specifies a "top secret" security level for the session, and forwards the request to server 400a. Server 400a receives the request and authenticates the calling party using the credentials contained therein. Assuming the calling party is authenticated, server 400a then determines if the calling party is authorized to participate in a session at the "top secret" security level specified in the request. As noted above, the calling party is authorized to participate in sessions at this security level, thus server 400a identifies an assertion for the calling party that may be used to establish the calling party's identity and establish that the calling party is authorized to participate in a session with a security level of "top secret". Server 400a then places the assertion in a response and forwards the response to communication unit 200a. The response may be a 407 (Proxy Authentication Required) message which indicates to the calling SIP phone to include the contents of the 407 5 message in a new INVITE message, along with new credentials for the server to verify. A SAML message body can be included in the 407 message to the calling party's phone to be included in the subsequent INVITE to the called party. Other protocols can be used in this step, prior to the initial INVITE containing the SAML assertion.

Note that if the calling party was not authorized to participate in a session at the "top secret" level and/or the calling party could not be authenticated, server 400a may generate a notification (e.g., error message) indicating these conditions and forward the error message to communication unit 200a. Communication unit 200a may receive the notification and, e.g., may indicate the error conditions on display 250.

Communication unit 200a receives the response, generates a SIP INVITE message, places the assertion in the message in the form of a SAML assertion, places the requested security level in the message and forwards the INVITE message to communication unit 200b. The INVITE message is received by server 400b which determines the message is for communication unit 200b and forwards the message to server 400c. Server 400c receives the INVITE message and forwards it to communication unit 200b.

Communication unit 200b receives the INVITE message and processes it including generating a request to verify the calling party's assertion and obtain an assertion for the called party that identifies the called party and indicates the called party is authorized to participate in sessions at a security level of "secret", as described above. The request can be a HTTP or SOAP request, as well as accomplished using COPS or another protocol. This is a simple, but secure, request/reply transaction.

The request is then forwarded to server 400d which verifies the calling party's assertion and verifies credentials associated with the called party, as described above. Assuming the calling party's assertion is true and the called party's credentials are accepted, server 400d identifies the requested assertion for the called party. Server 400d places the identified assertion for the called party in a response (e.g., HTTP, SOAP, COPS or other protocol, matching whichever protocol used in the request for called part assertion). In addition, server 400*d* places an indication that indicates (1) the calling party's assertion is true and has been accepted by server 400*d* and (2) the called party's credentials have been accepted in the response. Server 400*d* then forwards the response to communication unit 200*b*.

Communication unit 200*b* (1) receives the response, (2) verifies that its credentials have been accepted and the calling party's assertion is true, (3) generates a 183 (Session Progress) message (a provisional response) containing the called party's assertion as a SAML assertion and (4) forwards the 183 (Session Progress) message to communication unit 200*a*. Server 400*c* receives the 183 (Session Progress) message, determines the 183 (Session Progress) message is for communication unit 200*a* and forwards the message to server 400*b*. Server 400*b* receives the 183 (Session Progress) message and forwards it to communication unit 200*a*.

Communication unit 200*a* receives the 183 (Session Progress) message and processes it including generating a request to verify the called party's assertion contained therein. The request can be a HTTP or SOAP request, as well as accomplished using COPS or another protocol. This is a simple, but secure, request/reply transaction.

Communication unit 200*a* forwards the request to server 400*a* which verifies the called party's assertion, as described above. Assuming the called party's assertion is true and accepted by server 400*a*, server 400*a* generates a response (e.g., HTTP, SOAP, COPS or other protocol, matching whichever protocol used in the request for called party assertion) that indicates this and forwards the response to communication unit 200*a*.

Communication unit 200*a* receives the response, notes that the called party's assertion is true and has been accepted by server 400*a*, and identifies a security level for the session using the called party's security level, as described above. Communication unit 200*a* then generates a SIP UPDATE message containing the identified security level and forwards the UPDATE message to communication unit 200*b*. Communication unit 200*b* receives the UPDATE message, concludes its assertion was acceptable to the calling party and generates a 200 (OK) to the UPDATE back towards the calling party. The called party can also now generate the 200 (OK) to the original INVITE and believe it will be accepted. The calling party receives the 200 (OK) to the UPDATE, completing that transaction. The calling party also receives the 200 (OK) to the INVITE and generates a SIP ACK message and forwards the ACK message to communication unit 200*b*, as described above. Communication unit 200*b* receives the ACK message and concludes that the session has been successfully established, allowing Real-Time Transport Protocol (RTP) media packets to flow in both directions between the phones.

Figure 9A:
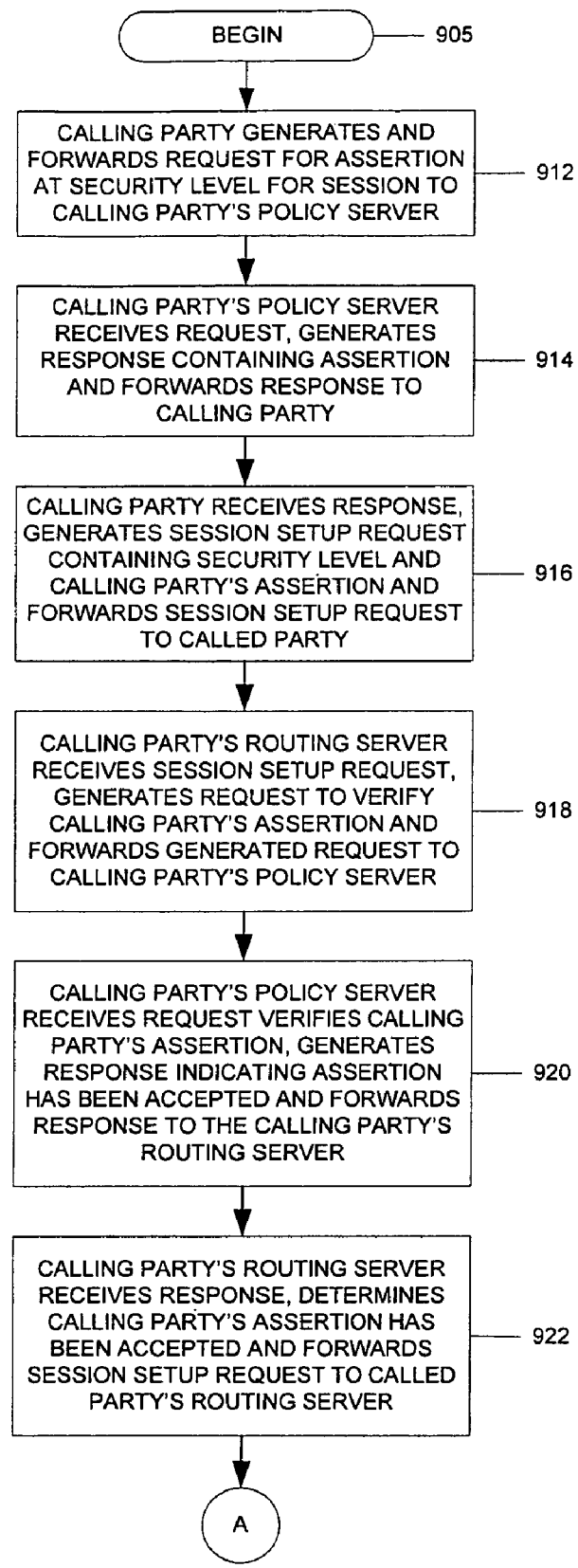
FIGS. 9A-C illustrate a flow chart of a sequence of steps that may be used to establish a communication session utilizing multiple trusted servers and policy servers.
Figure 9B:
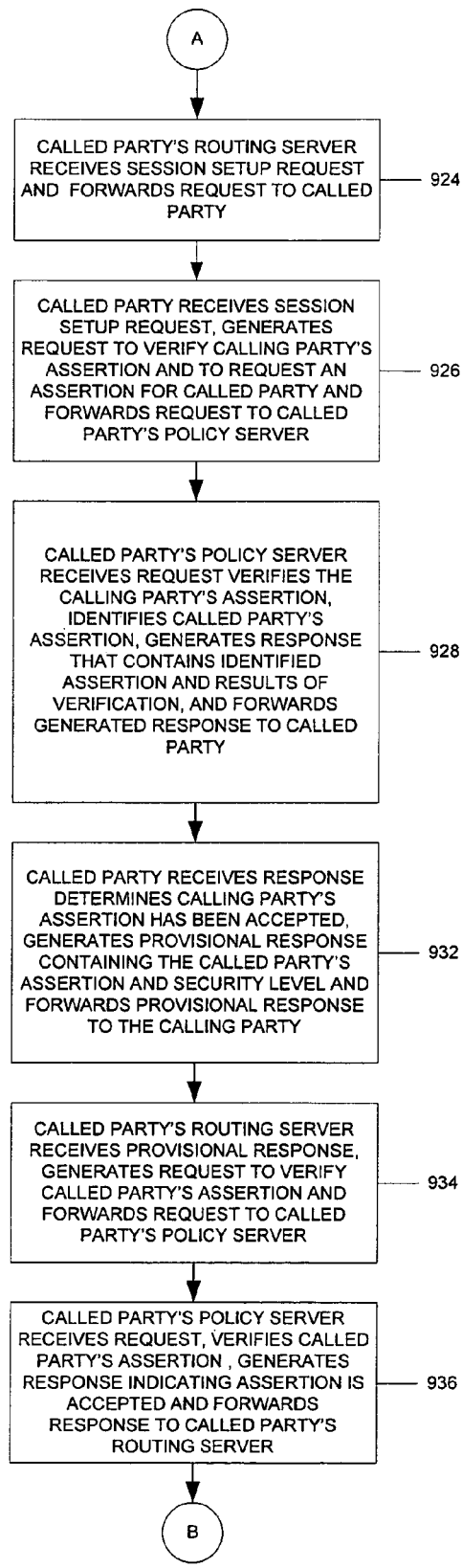
Figure 9C:
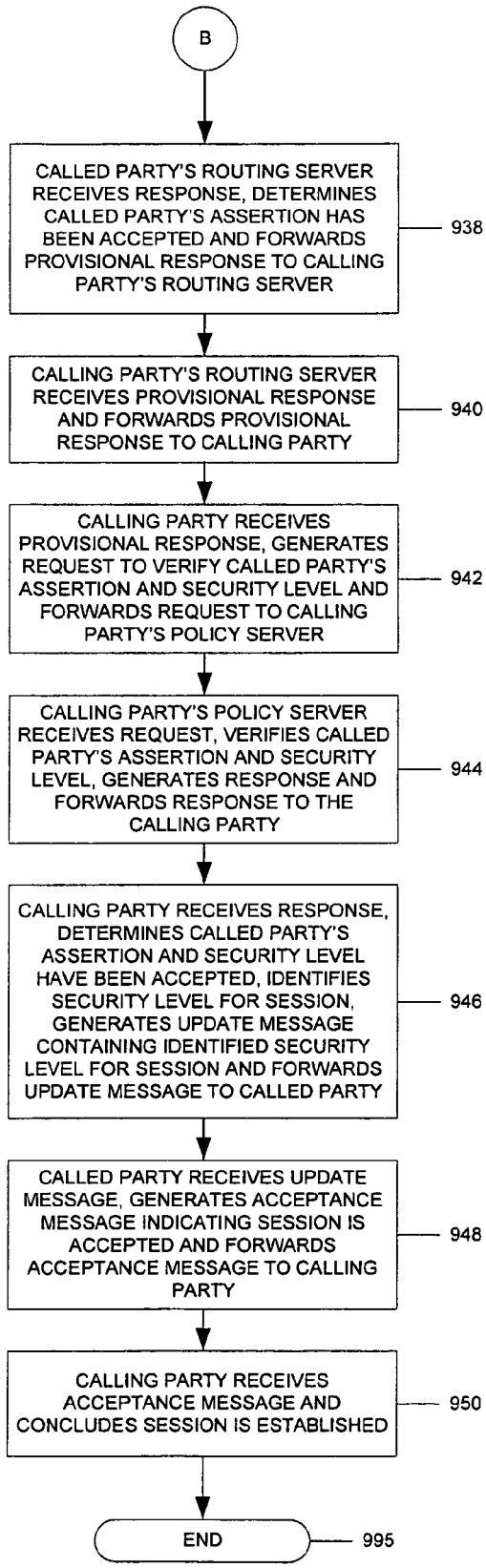

FIGS. 9A-C are a flow chart of a sequence of steps that may be used to establish a communication session in accordance with aspects of the techniques described herein. The sequence begins at step 905 and proceeds to step 912 where a calling party generates and forwards a request for an assertion (calling party's assertion) to a policy server associated with the calling party (calling party's policy server), as described above. At step 914, the calling party's policy server receives the request, generates a response containing the requested assertion and forwards the response to the calling party, as described above. At step 916, the calling party receives the response, generates a session setup request containing the security level and the calling party's assertion and forwards the session setup request to the called party.

At step 918, a routing server associated with the calling party (calling party's routing server) receives the session setup request, generates a request to verify the calling party's assertion and forwards the generated request to the calling party's policy server. At step 920, the calling party's policy server receives the request and verifies the calling party's assertion contained in the request to ensure it is true, as described above. Assuming the calling party's policy server finds the assertion is true and accepts the assertion, the calling party's policy server generates a response indicating that the assertion is accepted and forwards the response to the first routing server. At step 922, the calling party's routing server receives the response, determines that the calling party's assertion is accepted and forwards the session setup request to the called party's routing server. Note that had the calling party's policy server had not found the assertion to be unacceptable (e.g., not true), the calling party's policy server may generate a notification (response) indicating that the assertion has not been accepted. The called party's routing server may then drop (not forward) the session setup request, generate a notification to the calling party indicating the assertion has not been accepted by the calling party's policy server and forward the notification to the calling party.

At step 924 (FIG. 9B), a routing server associated with the called party (called party's routing server) receives the session setup request and forwards it to the called party. At step 926, the called party receives the session setup request, generates a request to verify the calling party's assertion and request an assertion for the called party, and forwards the request to a policy server associated with the called party (called party's policy server). Note that the request may contain credentials associated with the called party that are used by the called party's policy server to authenticate the called party.

Next, at step 928, The called party's policy server (1) receives the request, (2) verifies that the calling party's assertion contained therein, as described above, (3) identifies an assertion for the called party, as described above, (4) generates a response containing an indication of the results of the verification and the assertion for the called party, and (5) forwards the generated response to the called party. Note that if the calling party's policy server does not accept the calling party's assertion, it may generate and forward a notification to the called party and/or the calling party indicating that the calling party's assertion has not been accepted.

At step 932, the called party receives the response and determines that the called party's assertion has been accepted. The called party then generates a provisional response to the session setup request containing the called party's assertion and the called party's security level, and forwards the provisional response to the calling party.

The called party's routing server, at step 934, receives the provisional response and generates a request to verify the called party's assertion, as described above. The called party's routing server then forwards the generated request to the called party's policy server to verify the called party's assertion. Next, at step 936, the called party's policy server receives the request and verifies that the called party's assertion is true. Assuming the assertion is true, the called party's policy server accepts the assertion, generates a response indicating that the called party's assertion has been accepted and forwards the response to the called party's routing server.

At step 938 (FIG. 9C), the called party's routing server receives the response and determines that the called party's assertion has been accepted. The called party's routing server then forwards the provisional response that it had received earlier to the called party's routing server. Note that had the called party's policy server rejected the called party's assertion, the called party's policy server may generate a notification, as described above, indicating this situation and forward the notification to, e.g., the called party's routing server. The called party's routing server on receiving the rejection may then decide to drop the previously received provisional response and/or forward a notification to the called party that the assertion has not been accepted.

Next, at step 940, the calling party's routing server receives the provisional response and forwards the provisional response to the calling party. At step 942, the calling party receives the provisional response generates a request to verify the called party's assertion and security level, and forwards the request to the calling party's policy server. The calling party's policy server, at step 944, receives the request and verifies that the called party's assertion and security level to ensure the called party is authorized to participate in a session at the security level specified in the request.

Assuming the assertion is true, the called party's policy server accepts the assertion, generates a response indicating the assertion has been accepted and forwards a response to the calling party. At step 946, the calling party receives the response, determines that the called party's assertion and security level have been accepted, identifies a security level for the session, as described above, generates an update message containing the identified security level and forwards the update message to the called party. Note that at step 944, if the assertion was not accepted because e.g., it is not true, the policy server may generate a notification (e.g., error message) indicating the assertion has not been accepted and forward the notification to the calling party. After receiving the notification, the calling party may then choose to abandon the session.

At step 948, the called party receives the update message, generates an acceptance message indicating that the session is accepted and forwards the acceptance message to the calling party. At step 950, the calling party receives the acceptance message and concludes that the session is established. The sequence ends at step 995.

For example, referring to FIGS. 1 and 9A-9C, assume, as above, a user (calling party) at communication unit 200a wishes to establish a "top secret" communication session with another user (called party) at communication unit 200b in accordance with the techniques described herein using the SIP and SAML protocols. Further, assume, as above, that the calling party is cleared to participate in sessions up to a "top secret" security level and the called party is only cleared to participate in sessions up to a "secret" security level. In addition, assume that server 400a and server 400b act as a policy server and a routing server for communication unit 200a, respectively, and that server 400d and server 400c act as a policy server and a message routing server, respectively, for communication unit 200b.

Communication unit 200a generates a request for an assertion that contains credentials that may be used to authenticate the calling party and a "top secret" security level for the session (calling party's security level) and forwarding the request to server 400a (step 912). If SIP is used, the request is a SIP INVITE message. Otherwise, the request is an HTTP, SOAP or COPS request type message asking for an assertion for a subsequent call establishment. Server 400a receives the request, authenticates the calling party using the calling party's credentials contained therein and verifies that the calling party is authorized to participate in a session with a security level of "top secret". Server 400a then identifies an assertion for the calling party, as described above. Server 400a places the assertion in a response and forwards the response to communication unit 200a (step 914). If SIP is used, the response can be a 407 message (or some other non-fatal response) containing the SAML assertion. Otherwise, the response is an HTTP, SOAP or COPS reply type message answering with an assertion for the subsequent call establishment.

Communication unit 200a receives the response, generates a SIP INVITE message containing the assertion and the requested security level, and forwards the INVITE message to communication unit 200b (step 916). Server 400b receives the INVITE message, generates a request to verify the calling party's assertion and forwards the generated request to the server 400a (step 918). The request can be a HTTP or SOAP request, as well as accomplished using COPS or another protocol. This is a simple, but secure, request/reply transaction.

Server 400a receives the request and verifies that the calling party's assertion contained in the request is true. Assuming the calling party's assertion is true, server 400a accepts the assertion, generates a response (e.g., HTTP, SOAP, COPS or other protocol) indicating that the assertion has been accepted and forwards the response to server 400b (step 920). Server 400b receives the response, determines that the calling party's assertion has been accepted and forwards the INVITE message to server 400c (step 922). Server 400c receives the INVITE message and forwards it to communication unit 200b (step 924).

Communication unit 200b receives the INVITE message and processes it including generating a request (e.g., HTTP, SOAP, COPS or other protocol) to verify the calling party's assertion as well as obtain an assertion for the called party, as described above. Illustratively, the request includes the calling party's assertion, the security level contained in the INVITE message, the called party's security level (i.e., "secret") and credential information that server 400d may use to authenticate the called party (called party's credentials). Communication unit 200b then forwards the request to server 400d (step 926).

Server 400d receives the request, verifies the calling party's assertion and verifies credentials associated with the called party. Assume the calling party's assertion is true and the called party's credentials are accepted. Server 400d accepts the calling party's assertion and identifies an assertion for the called party, as described above. Server 400d then places the identified assertion in a response (e.g., HTTP, SOAP, COPS or other protocol) and an indication that the calling party's assertion has been accepted and forwards the response to communication unit 200b (step 928).

Communication unit 200b receives the response, generates a SIP 200 OK message to respond to the calling party's INVITE message, places the called party's assertion in the 200 OK message and forwards the 200 OK message to communication unit 200a (step 932). The 200 OK message is received by server 400c which generates a request (e.g., HTTP, SOAP, COPS or other protocol) to verify the called party's assertion (step 934), as described above, and forwards the request to server 400d.

Server 400d receives the request and uses information contained therein to verify the assertion, as described above. Assume that server 400d finds the assertion to be true and accepts the assertion. Server 400d then generates a response (e.g., HTTP, SOAP, COPS or other protocol) indicating the assertion has been accepted and forwards the response to server 400c (step 936). Server 400c receives the response, concludes the called party's assertion has been accepted and forwards the 200 OK message to server 400b (step 938).

Server 400b receives the 200 OK message and forwards it to communication unit 200a (step 940).

Communication unit 200a receives the 200 OK message and processes it including generating a request (e.g., HTTP, SOAP, COPS or other protocol) to verify the called party's assertion contained therein, as described above. Communication unit 200a then forwards the request to server 400a (step 942). Server 400a receives the request and verifies the called party's assertion, as described above. Assume server 400a finds the called party's assertion to be true and accepts the assertion. Server 400a then generates a response (e.g., HTTP, SOAP, COPS or other protocol) that indicates the called party's assertion has been accepted and forwards the response to communication unit 200a (step 944).

Communication unit 200a receives the response, notes that the called party's assertion has been accepted and identifies a security level for the session using the security level specified in the INVITE message and the called party's security level, as described above. Communication unit 200a then generates a SIP UPDATE message containing the identified security level and forwards the UPDATE message to communication unit 200b (step 946). Communication unit 200b receives the UPDATE message, concludes its assertion was acceptable to the calling party and generates a 200 (OK) to the UPDATE back towards the calling party. The called party can also now generate the 200 (OK) to the original INVITE and believe it will be accepted. The calling party receives the 200 (OK) to the UPDATE, completing that transaction. The calling party also receives the 200 (OK) to the INVITE and generates a SIP ACK message and forwards the ACK message to communication unit 200b, as described above. Communication unit 200b receives the ACK message and concludes that the session has been successfully established, allowing Real-Time Transport Protocol (RTP) media packets to flow in both directions between the phones.

Note that if server 400a determined that the called party's assertion was not true, server 400a may indicate this condition in the response. After receiving the response, communication unit 200a may then abandon the communication session. In addition, either server 400a or communication unit 200a may generate a notification that is forwarded to communication 200b to indicate the communication session is abandoned.

Figure 10:
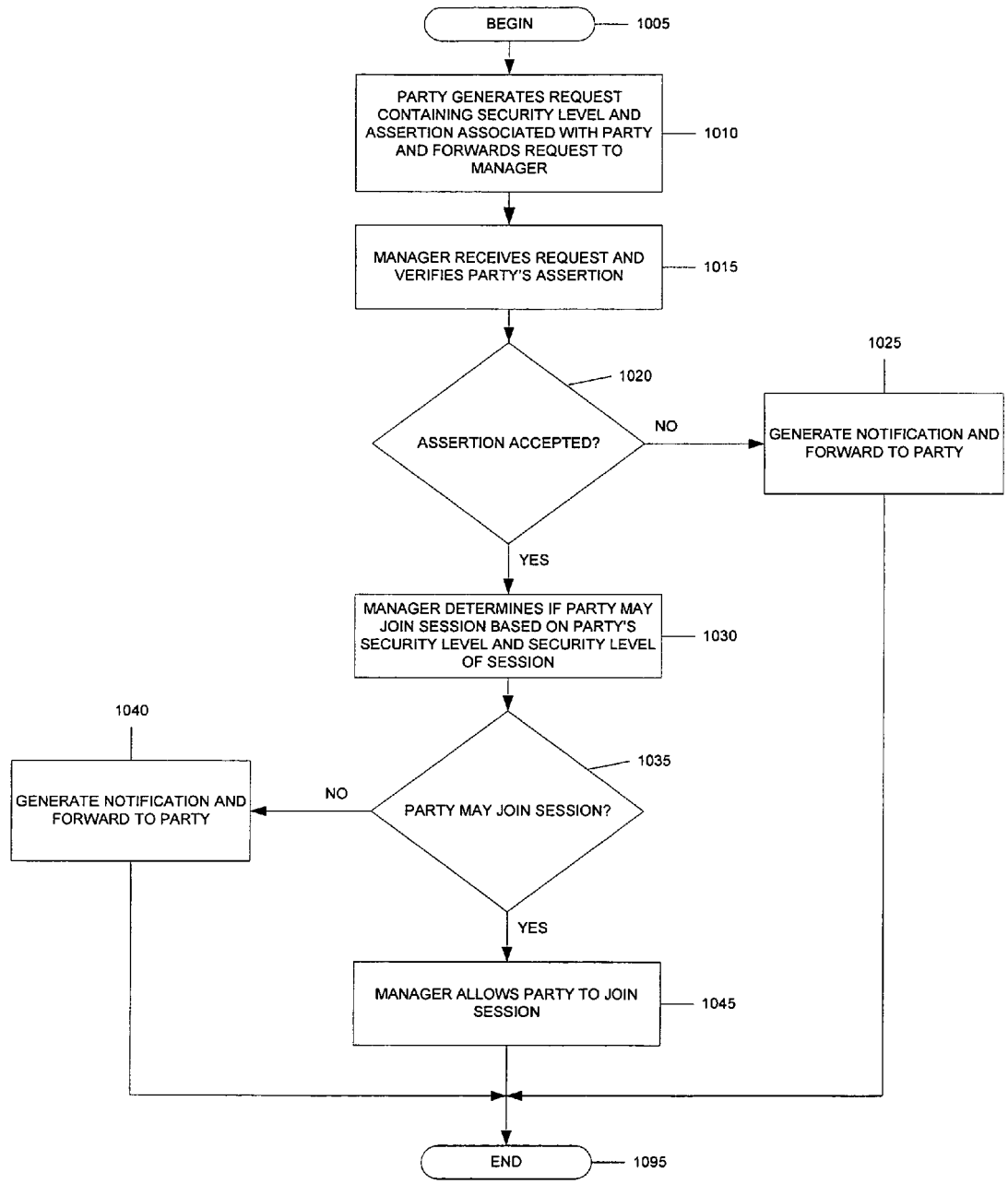
FIG. 10 illustrates a flow chart of a sequence of steps that may be used to enable a party to join an established communication session.

FIG. 10 is a flow chart of a sequence of steps that may be used to enable a party to join an established communication session in accordance with an aspect of the techniques described herein. Referring to FIG. 10, the sequence begins at step 1005 and proceeds to step 1010 where a party generates a request containing a security level and an assertion associated with the party and forwards the request to a manager that is managing the established communication session. The assertion illustratively indicates the identity of the party and asserts that the party is entitled to participate in sessions at the specified security level.

At step 1015, the manager receives the request and verifies the assertion, as described above. At step 1020, a check is performed to determine if the assertion is accepted. If the assertion is not true, the assertion is not accepted and the sequence proceeds to step 1025 where a notification is generated and forward to the party. The sequence then proceeds to step 1095. Assuming the assertion is true, the assertion is accepted and the sequence proceeds to step 1030.

At step 1030, the manager determines if a party may join the session based on the party's security level and the security level of the session. Illustratively, if the party's security level matches or is higher than the security level of the session, the manager concludes the party may join the session. Otherwise, illustratively, the manager concludes the party is not allowed to join the session. At step 1035, if the party is not allowed to join the session, the sequence proceeds to step 1040 where a notification indicating that the party may not join the session is generated and forwarded to the party. If at step 1035, the party may join the session, the sequence proceeds to step 1045 wherein the manager allows the party to join the session. The sequence ends at step 1095.

It should be noted that in the above, if the manager determines the party may not join the session because, e.g., the party's security level is lower than the security level of the session, the manager may downgrade the security level of the session to enable the party to join the session. Here, as noted above, the manager may notify the parties participating in the session that the session is being downgraded. This notification may be, e.g., audible or visual, also as noted above.

It should be also noted that various above-described functions performed by the communication units 200 above may be performed by various servers 400 contained in the communication network 100. For example, a server 400 may be configured as a proxy that manages setting up a session for a communication unit 200. Requests to establish a session with a communication unit 200 that is serviced by the server 400 may be processed by the server 400, as described above.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
issuing a request from a first communication device in a communication network to establish a communication session with a second communication device in the communication network, the request containing a first security level associated with a first party at the first communication device;
receiving, by the first communication device, a response to the request from the second communication device, the response containing a second security level associated with a second party at the second communication device;
identifying a security level for communications during the session based on the first and second security levels, wherein if the second security level matches the first security level, the first security level is identified as the security level for the session, if the second security level is a higher security level than the first security level, the first security level is identified as the security level for the session, and if the second security level is a lower security level than the first security level, the second security level is identified as the security level for the session; and
establishing the session, via the network, at the identified security level.

2. A method as defined in claim 1 further comprising:
providing an indication of the identified security level at the first communication device.

3. A method as defined in claim 2 wherein the indication is an audio indication.

4. A method as defined in claim 2 wherein the indication is a visual indication.

5. A method as defined in claim 1 further comprising:
verifying that the second party is authorized to communicate at the second security level.

6. A method as defined in claim 5 wherein the response from the second communication device contains an assertion that indicates the second party is entitled to establish a session at the second security level, and wherein verifying further comprises:
  determining if the assertion is true.

7. A method as defined in claim 6 further comprising:
  abandoning establishment of the session if the assertion contained in the response is determined to be not true.

8. A method as defined in claim 6 wherein determining comprises:
  generating a request to verify the assertion;
  forwarding the request to a node in the communication network to verify the assertion; and
  receiving a response from the node indicating results of the verification of the assertion.

9. A node in a communication network comprising:
  a network interface configured to receive, from a second communication device, a response to a request sent from a first communication device to the second communication device to establish a communication session in the communication network, the request containing a first security level associated with a first party at the first communication device and the response containing a second security level associated with a second party at the second communication device; and
  processing circuitry configured to identify a security level for communications during the session based on the first and second security levels, wherein if the second security level matches the first security level, the first security level is identified as the security level for the session, if the second security level is a higher security level than the first security level, the first security level is identified as the security level for the session, and if the second security level is a lower security level than the first security level, the second security level is identified as the security level for the session, and to establish the session at the identified security level.

10. A node as defined in claim 9 wherein the processing circuitry is further configured to:
  provide an indication of the identified security level.

11. A node as defined in claim 10 wherein the indication is at least one of an audio indication or a visual indication.

12. A node as defined in claim 9 wherein the processing circuitry is further configured to verify that the second party is authorized to communicate at the second security level.

13. A node as defined in claim 12 wherein the response from the second communication device contains an assertion that indicates the second party is entitled to establish a session at the second security level, and wherein the processing circuitry is further configured to determine if the assertion is true.

14. A node as defined in claim 13 wherein the processing circuitry is further configured to abandon establishment of the session if the assertion contained in the response is determined to be not true.

15. A method comprising:
  receiving a request from a third party to join an established communication session between first and second communication devices, wherein the request comprising a security level associated with the third party;
  determining if the third party is permitted to join the session based on the security level associated with the third party and based on a security level of the established session:
  allowing the third party to join the established session based on the determination;
  broadcasting an identity of the third party to the first and second communication devices; and
  upgrading the security level of the established session to a higher security level if all participants of the session have access to the higher security level.

16. A method as defined claim 15 further comprising:
  providing an audio indication of the higher security level to the participants.

17. A method as defined in claim 15 further comprising:
  providing a visual indication of the higher security level to the participants.

18. A method of claim 1, wherein the first and second parties are users of the communication network.

19. A method of claim 1, wherein at least one of the first or second parties are processors in or coupled to the first or second communication devices.

20. The method of claim 1, wherein receiving a response to the request from the second communication device comprises:
  receiving a response containing a second security level associated with a second party at the second communication device that is based on the first security level contained in the request.

* * * * *